United States Patent [19]
Fukui et al.

[11] Patent Number: 5,343,844
[45] Date of Patent: Sep. 6, 1994

[54] APPARATUS AND METHOD FOR DETECTING MISFIRING IN AN INTERNAL COMBUSTION ENGINE

[75] Inventors: Wataru Fukui; Toshio Iwata; Toshio Ohsawa, all of Himeji, Japan

[73] Assignee: Mitsubishi Denki Kabushiki Kaisha, Tokyo, Japan

[21] Appl. No.: 718,129

[22] Filed: Jun. 20, 1991

[30] Foreign Application Priority Data

Jun. 25, 1990 [JP] Japan .................. 2-164185
Jun. 25, 1990 [JP] Japan .................. 2-164186
Jun. 25, 1990 [JP] Japan .................. 2-164187

[51] Int. Cl.$^5$ .................. F02P 17/00; F02D 41/22
[52] U.S. Cl. .................. 123/481; 123/630; 73/116
[58] Field of Search ............ 123/198 D, 198 DB, 479, 123/481, 630; 73/116, 117.3

[56] References Cited

U.S. PATENT DOCUMENTS

| | | | |
|---|---|---|---|
| 4,003,248 | 1/1977 | Leichle | 73/116 |
| 4,366,793 | 1/1983 | Coles | 123/438 X |
| 4,967,727 | 11/1990 | Takahashi et al. | 123/481 |
| 4,987,771 | 1/1991 | Iwata | 123/481 X |

FOREIGN PATENT DOCUMENTS 4116272 11/1991 Fed. Rep. of Germany.

OTHER PUBLICATIONS

"Ionenstrommessung an Zündkerzen von Ottomotoren als Klopfer Kennungsmittel", Motortechnische Zeitschrift 51 (1990) 3, pp. 118–122.

*Primary Examiner*—Tony M. Argenbright
*Attorney, Agent, or Firm*—Sughrue, Mion, Zinn, Macpeak and Seas

[57] ABSTRACT

Misfiring in a cylinder of an engine can be detected with high reliability using a statistical treatment even if the level of ion current generated by a spark plug upon ignition thereof is affected by noise. An ion current, which is generated when a spark plug for a cylinder discharges, is detected to provide a corresponding voltage which is then integrated or peak held to produce a current component signal which is generated for a predetermined time from the time of discharge of the spark plug. The current component signal is used as misfiring information and compared with a prescribed threshold so as to determine whether there is misfiring in the cylinder. Misfirings thus detected are counted so as to evaluate the state or extent of misfiring in the cylinder. If the state of misfiring is serious, the fuel supply to the cylinder is stopped. If, however, it is light, an appropriate measure for optimizing the operation of the misfiring cylinder is taken to remedy such a situation and recover normal combustion therein.

13 Claims, 8 Drawing Sheets

APPARATUS AND METHOD FOR DETECTING MISFIRING IN AN INTERNAL COMBUSTION ENGINE

BACKGROUND OF THE INVENTION

The present invention relates to an apparatus and method for detecting misfiring in an internal combustion engine which can detect misfiring of the engine based on an ion current generated by a spark plug in the space between the electrodes thereof. More particularly, it relates to a misfiring detecting apparatus and method in which a current signal corresponding to the level of ion current thus generated is compared with a threshold so as to determine engine misfiring.

In general, internal combustion engines such as automotive gasoline engines have a plurality (for example four) of cylinders which are operated through four cycles including an intake stroke, a compression stroke, a power stroke and an exhaust stroke. In order to properly control the ignition timing of the cylinders, the order of fuel injection into the cylinders, etc., an engine control unit in the form of a microcomputer is employed for performing various electronic calculations. To this end, based on a cylinder reference position signal representative of the crank positions of the cylinders and a cylinder identification signal which are both generated by a signal generator in synchronism with the rotation of the engine, the microcomputer identifies the operating positions of the cylinders and properly controls their operations.

For example, for control of cylinder ignition, the fuel/air mixture in each cylinder compressed by a piston must be fired for combustion at an optimum timing by a spark generated by a spark plug. In this connection, however, there are times when the mixture in a cylinder, though ignited by a spark plug, does not properly combust depending upon the state of combustion, the condition of the spark plug, etc. In this situation, an abnormal load is applied to the remaining cylinders, giving rise to a fear of engine damage. Thus, in order to maintain safe engine operation, there is a need to detect, for each ignition cycle of each cylinder, whether the mixture in a cylinder has combusted without fail. For such a purpose, a misfiring detecting apparatus has been proposed which can determine the condition of combustion for each cylinder by detecting an ion current which is generated by a spark plug in the space between the electrodes thereof.

FIG. 10 illustrates a typical example of such a known misfiring detecting apparatus for an internal combustion engine. In this figure, a crankshaft 1 of an unillustrated engine is connected with a plurality of pistons received in cylinders (not shown) so that it is driven to rotate in accordance with the operations of the pistons. A camshaft 2 is operatively connected through a timing belt 3 with the crankshaft so as to rotate in synchronism with the rotation of the crankshaft 1.

In the case of normal four-cycle engines, a series of four cycles comprising an intake stroke, a compression stroke, a power stroke and an exhaust stroke are performed for every two revolutions of the crankshaft so that the camshaft, 2 is rotated to perform one revolution per two crankshaft revolutions. Thus, the camshaft 2 rotates one complete revolution for a four-cycle operation of each cylinder in synchronism therewith. As a result, with a four-cylinder engine, the operating positions of the pistons in the cylinder are out of phase with each other by a half revolution (i.e., 180 degrees) of the crankshaft 1 and hence by a quarter of one revolution (i.e., 90 degrees) of the camshaft 2.

A signal generator, which is generally designated by reference character S, includes a rotating shaft 4 connected to the camshaft 2, and a rotating disk 5 fixedly mounted on one end of the rotating shaft 4 for detecting the reference positions of each cylinder. The rotating disk 4 has a plurality (four in the illustrated example) of first windows in the form of arcuate slits 6 formed therethrough, the slits being disposed on a circle around the axis of the rotating shaft 4 and spaced from each other at the same circumferential intervals. Each of the slits 6 has a leading edge and a trailing edge which correspond to prescribed piston positions of a corresponding cylinder. In addition, though not, illustrated, the rotating disk 5 has a second window in the form of a slit formed therethrough, the second slit corresponding to a specific one of the cylinders for identifying it from the remaining ones.

A pair of fixed support plates 8 are provided on the opposite sides of the rotating disk 5. A photocoupler (not shown) including a light emitting diode and a phototransistor is mounted on the opposing support plates 8 on a circle on which the slits 6 in the rotating disk 5 are disposed. Each of the arcuate slits has a leading edge corresponding to a first reference crank position of a corresponding cylinder and a trailing edge corresponding to a second reference crank position thereof in a rotating direction of the rotating disk 5. Each time one of the first slits 6 and the unillustrated second slit in the rotating disk 5 passes between the light emitting diode and the phototransistor of the photocoupler or becomes in alignment therewith during rotation of the rotating disk 5, the photocoupler generates an output signal L containing a train of pulses each of which rises at the leading edge of a slit and falls at the trailing edge thereof.

A controller 10 in the form of an electronic control unit (hereinafter referred to as an ECU) comprising a microcomputer receives the output signal L from the photocoupler as well as other various kinds of signals representative of the operating condition of the engine generated by various sensors (not shown) such as an engine speed sensor, an engine load sensor, etc., so that on the basis of these input signals, it performs various engine control operations such as fuel control, ignition control, etc. For example, based on these signals, the ECU 10 determines the order of operations of the cylinders of the engine, and control s the operations such as ignition of the respective cylinders based on the operating order -thus determined.

A power transistor 11 in the form of an NPN transistor having a grounded emitter is driven to be turned on and off under the control of the ECU 10. An ignition coil 12 has a primary winding connected to a collector of the power transistor 11, and a secondary winding connected to a spark plug 13 through a reverse-current checking diode 14. The power transistor 11, the ignition coil 12, the spark plug 13 and the diode 14 together constitute an ignition means. Although such an ignition means is provided for each of the cylinders, only one of them is exemplarily shown in FIG. 10.

An ion current detector, generally designated by reference numeral 20, is connected between one end of the spark plug 13 and the ECU 10. The ion current detector 20 includes a reverse-current checking diode 21 having a cathode connected to a node between the diode 14 and the spark plug 13, a load resistor 22 having one end thereof connected to an anode of the diode 21, a DC power supply 23 connected in series to the other end of the load resistor 22, a pair of voltage-dividing resistors 24, 25 connected in parallel to a series circuit comprising the load resistor 22 and the DC power supply 23, a capacitor 26 having one end thereof connected to a junction between the diode 21 and the load resistor 22, a comparator 27 having a first negative input terminal connected to a node between the serially connected resistors 24, 25, a second positive input terminal and an output terminal connected to the ECU 10, and a pair of voltage-dividing resistors 28, 29 connected in series to each other between a constant power supply and ground with a node therebetween being connected to the second input terminal of the comparator 27 for supplying it with a constant threshold voltage TH. The voltage-dividing resistors 24, 25 together constitute a voltage generating means for generating a voltage V corresponding to an ion current I. Also, the voltage-dividing resistors 28, 29 together constitute a threshold generating means for generating a constant threshold voltage which is applied as a combustion determining reference to the second input terminal of the comparator 27.

The operation of the known misfiring detecting apparatus as constructed above will now be described in detail. As the crankshaft 1 rotates, the rotating disk 5 is driven to rotate through the intermediary of the timing belt 3, the camshaft 2 and the rotary shaft 4. During rotation of the rotating disk 5, the photocoupler (not shown) mounted on the support plates 8 generates an output signal L as the first slits 6 and the unillustrated second slit pass between the light emitting diode and the phototransistor (not shown) mounted on the opposing support plates 8. The signal L thus generated includes a crank angle reference signal representative of predetermined crank positions of each cylinder and a cylinder identification signal for identifying a specific one of the cylinders. The crank angle reference signal contains a train of pulses each of which rises at the leading edge of a slit 6 corresponding to a first reference crank position (e.g., 75 degrees before top dead center (BTDC)) of a corresponding cylinder and falls at the trailing edge thereof corresponding to a second crank angle position (e.g., 5 degrees BTDC) of the cylinder. For example, the first reference crank position is a control reference such as a power-supply starting time at which the power supply to the ignition coil 12 is started by the ECU 10, and the second reference crank angle position is another control reference such as an ignition time at which the power supply to the ignition coil 12 is cut off for causing the spark plug 13 to generate a spark. The cylinder identification signal contains a pulse corresponding to the specific cylinder which is generated, for example, at the time when a pulse of the crank angle reference signal corresponding to the specific cylinder is generated. The signal L of the signal generator S as well as other signals representative of the operating condition of the engine are input to the ECU 10. Some examples of the other signals are an engine rotation signal representative of the number of revolutions per minute of the engine, and an engine load signal representative of the engine load or the throttle opening.

Based on the signal L, the ECU 10 identifies the operating order or states of the respective cylinders, and it generates and distributes an ignition control signal to the power transistors 11 for the corresponding cylinders at proper timing according to the operating order thereof thus determined. As a result, one of the power transistors 11 is turned on by the ignition control signal from the ECU 10, so that a current starts to flow from the power supply to ground through the primary winding of the ignition coil 12 and the now conductive power transistor 11. After current has been supplied to the primary winding of the ignition coil 12 for a predetermined period of time, the ECU 10 stops generating the ignition control signal, thus turning off the power transistor 11. As a result, a high voltage is developed across the secondary winding of the ignition coil 12 to cause the spark plug 13 to generate a spark. Then, the voltage applied to the ignition coil 12 by the power supply, which is a negative voltage, is interrupted immediately after the discharge of the spark plug 13.

Immediately after the discharge or sparking of the spark plug 13 causing explosive combustion of an air/fuel mixture near the spark plug 13, there will develop a great number of positive ions in the limited space between the electrodes of the spark plug 13, generating an ion current I therearound. The ion current I thus generated by the positive ions is attracted to the negative electrode of the spark plug 13 and thence flows to the negative electrode of the DC power supply 23 by way of the diode 21 and the load resistor 22. As a result, the ion current I generates a voltage across the load resistor 22 which is changed into a voltage V by the voltage-dividing resistors 24, 25 and then fed to the first negative input terminal of the comparator 27. The voltage V input to the comparator 27 corresponds to and is proportional to the ion current I. That is, the voltage V becomes high when explosion or combustion takes place whereas it becomes low in the absence of combustion. On the other hand, the second positive input terminal of the comparator 27 is supplied with a threshold voltage TH which is set to a predetermined constant value by the voltage-dividing resistors 28, 29. Accordingly, the comparator 27 generates a low level output when the voltage V is less than the threshold TH, and a high level output when the volt, age V is equal to or greater than the threshold TH. That is, the comparator 27 outputs an ON signal to the ECU 10 only when it detects an ion current I.

Based on the voltage V representative of the ion current I thus detected and the operating order or states of the cylinders identified from the signal L, the ECU 10 determines whether normal combustion has taken place in the cylinder which had been fired.

If the fired cylinder is normal or normal combustion is taking place in the firing cylinder due to discharge or sparking of the corresponding spark plug 11, a number of positive ions are thereby generated in the limited space between the electrodes of the spark plug 13. If, however, there is no explosion or combustion for some reason, there will be substantially no positive ions generated. As a result, the ECU 10 can determine the condition of combustion or misfiring in the fired cylinder on the basis of the voltage V and the identified operating order or states of the cylinders.

In this connection, however, there is a tendency for noise having a short pulse width to be superposed on the ion current I particularly at the time of ignition for example, so that the level or voltage V of the ion current is thereby raised. Accordingly, if the condition of combustion is determined based solely on the result of such a comparison, there is a possibility that the comparator 27 will generate an output C representative of an ion current of a high level. In this case, the ECU 10 would determine that normal combustion has taken place in a fired cylinder, despite the fact that no combustion has actually occurred therein. This may lead to engine damage, as referred to above.

With the known misfiring detecting apparatus as described above, in which it is determined that combustion has taken place when the level V of ion current exceeds the threshold TH, there is a defect that in the event that noise greater than the threshold TH is momentarily applied, incorrect determination is made in spite of the occurrence of a misfire. In addition, among many ignition cycles or power strokes, misfiring will sometimes accidentally happen without any particular abnormality in engine operation, so it is not practical to make the determination of misfiring (i.e., abnormality in the engine) based on a single detection or a few detections of misfiring which might occur by chance. Thus, it is difficult to perform highly reliable determination of misfiring in the cylinders at all times.

Moreover, though it is a general measure to stop the supply of fuel to a cylinder which is determined to be misfiring, irrespective of the state or extent of misfiring, such a measure is not always effective for treating misfiring since relatively light or not so serious misfiring situations can be remedied to recover normal combustion by taking other suitable measures such as increasing ignition energy and the like.

SUMMARY OF THE INVENTION

Accordingly, the present invention is intended to overcome the above-described problems encountered with the known misfiring detecting apparatus.

It is an object of the invention to provide a novel and improved apparatus and method for detecting misfiring in an internal combustion engine which can detect misfiring in a cylinder with high reliability even if noise of a high level is instantaneously superposed on an ion current signal.

It is another object of the invention to provide a novel and improved apparatus and method for detecting misfiring in an internal combustion engine which can determine the state or extent of misfiring in a cylinder with high reliability and optimally control misfiring depending upon the state or extent thereof.

It is a further object of the invention to provide a novel and improved method for detecting misfiring in an internal combustion engine which processes information for treating misfiring in a stepwise manner for improved misfiring control.

With the above objects in view, according to one aspect of the present invention, there is provided an apparatus for detecting misfiring in an internal combustion engine comprising:
  ion current detecting means for detecting an ion current which is generated when a spark plug for a cylinder discharges, and generating a corresponding output signal;
  current component detecting means for generating a current component signal representative of the level of the output signal of the ion current detecting means which is generated for a predetermined time from the time of discharge of the spark plug; and
  misfiring determining means for comparing the current component signal with a prescribed threshold so as to determine whether there is misfiring in the cylinder.

In one embodiment, the current component detecting means comprises an integrator for integrating the output signal of the ion current detecting means.

In another embodiment, the current component detecting means comprises a peak-hold circuit for holding a peak level of the output signal of the ion current detecting means and generating a corresponding output signal. Preferably, a low-pass filter is provided between the peak-hold circuit and the ion current detecting means for filtering a high-frequency noise component input to the low-pass filter.

Preferably, the misfiring determining means comprises: an engine operating condition determiner for detecting the operating conditions of the engine and generating a corresponding output signal; a threshold calculator for calculating the threshold based on the output signal of the engine operating condition detecting means; a comparator for comparing the current component signal from the current component detecting means with the threshold and generating an output when the current component signal is greater than the threshold; and a misfiring determiner for determining, based on the output signal of the comparator, whether there is misfiring in the cylinder.

According to another aspect of the invention, there provided a method for detecting misfiring in an internal combustion engine comprising the steps of:
  generating a misfiring signal representative of misfiring of a cylinder;
  comparing the misfiring signal with a threshold so as to determine whether the misfiring signal is equal to or less than the threshold;
  incrementing a misfiring counter if the misfiring signal is equal to or less than the threshold;
  resetting the misfiring counter if the misfiring signal is greater than the threshold; and
  determining that there is misfiring in the cylinder when the misfiring counter reaches a prescribed number.

According to a further aspect of the invention, there is provided a method for detecting misfiring in an internal combustion engine comprising the steps of:
  generating a misfiring signal representative of misfiring of a cylinder;
  comparing the misfiring signal with a threshold so as to determine whether the misfiring signal is equal to or less than the threshold;
  incrementing a misfiring counter if the misfiring signal is equal to or less than the threshold;
  resetting the misfiring counter if the misfiring signal is greater than the threshold; and
  comparing the counted number of the misfiring counter with a first reference number and a second reference number which is greater than the first reference number;
  determining that there is no misfiring in the cylinder if the misfiring counter is greater than the second reference number;
  determining that there is normal misfiring in the cylinder if the misfiring counter is equal to or less than the second reference number but greater than the first reference number; and
  determining that there is abnormal misfiring in the cylinder if the misfiring counter is equal to or less than the first reference number.

According to a yet further aspect of the invention, there is provided a method for detecting misfiring in an internal combustion engine comprising the steps of:

generating a misfiring signal representative of misfiring of a cylinder;
incrementing an ignition counter for counting the number of ignitions for the cylinder upon generation of the misfiring signal;
comparing the misfiring signal with a threshold so as to determine whether the misfiring signal is equal to or less than the threshold;
incrementing a misfiring counter for counting the number of misfirings of the cylinder if the misfiring signal is equal to or less than the threshold;
calculating the rate of misfiring for the cylinder based on the counted number of the misfiring counter when the ignition counter reaches a prescribed number; and
determining that there is misfiring in the cylinder if the rate of misfiring is greater than a prescribed reference.

According to a still further aspect of the invention, there is provided a method for detecting misfiring in an internal combustion engine comprising the steps of:

generating a misfiring signal representative of misfiring of a cylinder;
incrementing an ignition counter for counting the number of ignitions for the cylinder upon generation of the misfiring signal;
comparing the misfiring signal with a threshold so as to determine whether the misfiring signal is equal to or less than the threshold;
incrementing a misfiring counter for counting the number of misfirings of the cylinder if the misfiring signal is equal to or less than the threshold;
calculating the rate of misfiring for the cylinder based on the counted number of the misfiring counter when the ignition counter reaches a prescribed number;
comparing the rate of misfiring with a first reference and a second reference which is greater than the first reference;
determining that there is no misfiring in the cylinder if the rate of misfiring is less than the first reference;
determining that there is normal misfiring in the cylinder if the rate of misfiring is equal to or greater than the first reference but less than the second reference; and
determining that there is abnormal misfiring in the cylinder if the rate of misfiring is equal to or greater then the second reference.

Preferably, the steps of incrementing the ignition counter and the misfiring counter are started at the time when it is first determined that the misfiring signal is equal to or less than the threshold.

Preferably, the fuel supply to the misfiring cylinder is stopped if there is abnormal misfiring in the cylinder, and the operation of the misfiring cylinder is optimized if there normal misfiring in the cylinder.

The above and other objects, features and advantages of the invention will more readily apparent from the following detailed description of a preferred embodiment of the invention taken in conjunction with the accompanying drawings.

DESCRIPTION OF THE PREFERRED EMBODIMENTS

A few preferred embodiments of the present invention will be described in detail while referring to the accompanying drawings.

Figure 1:
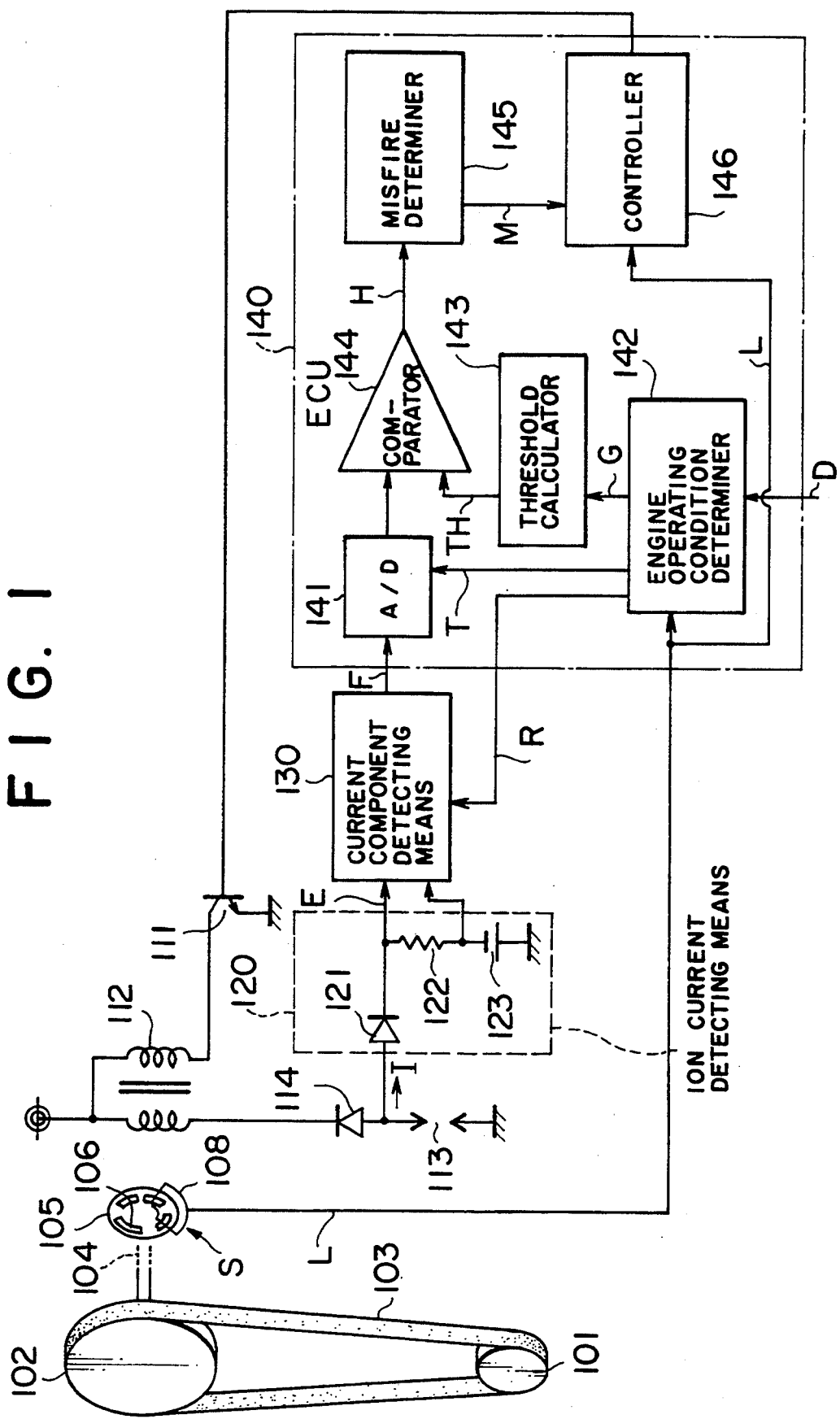
FIG. 1 is a block diagram showing the schemeric arrangement of a misfiring detecting apparatus for an internal combustion engine in accordance with the present invention.
Figure 10:
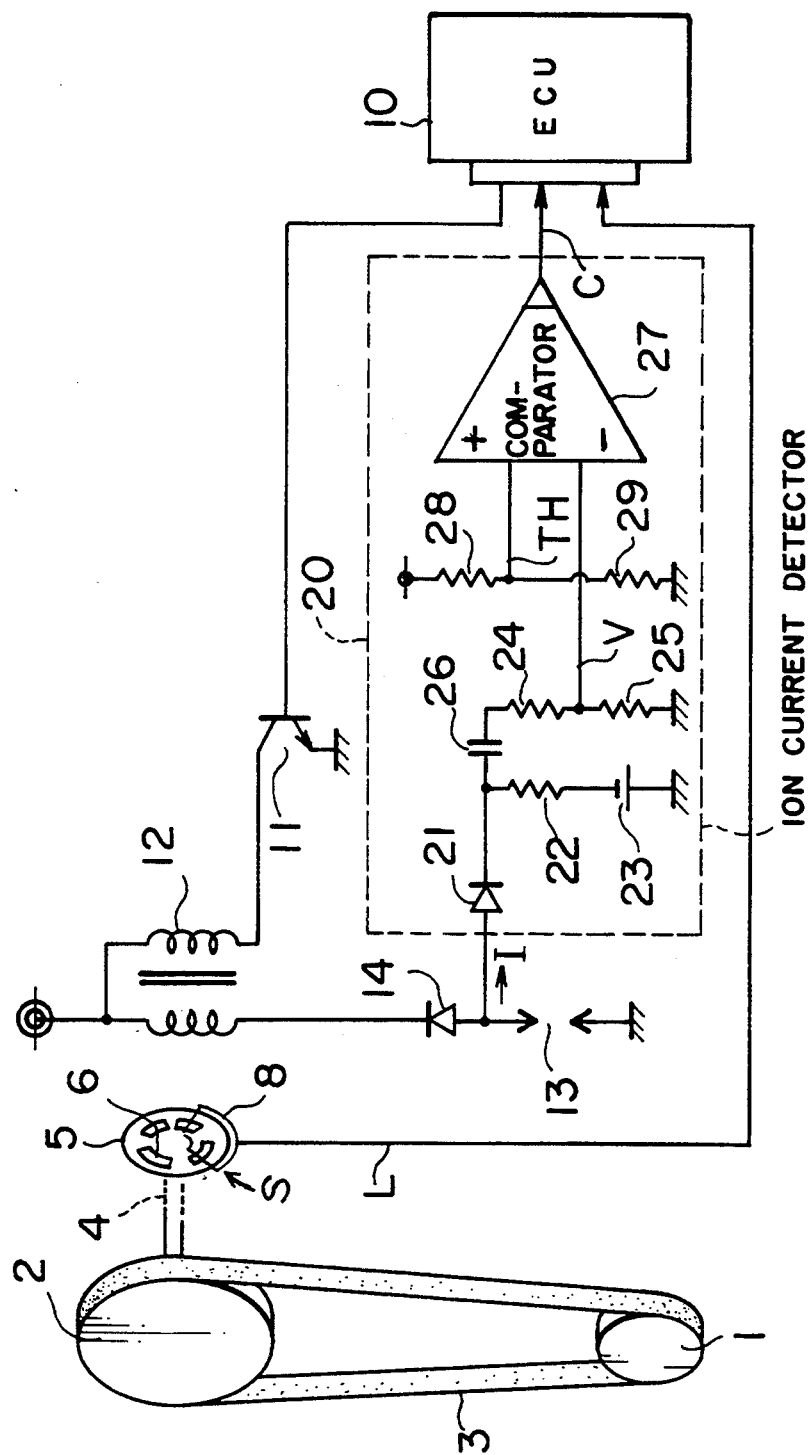
FIG. 10 is a schematic diagram showing the arrangement of a known misfiring detecting apparatus in an internal combustion engine.

Referring first to FIG. 1, there is shown a misfiring detecting apparatus for an internal combustion engine in accordance with the invention. In FIG. 1, reference numerals 101 through 106, 108, and 111 through 114 and reference character S designate the same elements as those which are designated by reference numerals 1 through 6, 8, and 11 through 14 and reference character S of FIG. 10, respectively.

The misfiring detecting apparatus as illustrated in FIG. 1 is constructed as follows. An ion current detecting means 120 detects an ion current I which is generated between the electrodes of a spark plug 113 connected through a diode 114 to a secondary winding of an ignition coil 112 when power supply to a primary winding of the ignition coil 112 is cut off. The ion current detecting means 120 comprises a reverse-current checking diode 121 having an anode connected to a node between the diode 114 and the spark plug 113, a resistor 122 having one end thereof connected to a cathode of the reverse-current checking diode 121 for converting the ion current I into a corresponding voltage, and a DC power supply 123 connected to the other end of the resistor 122. Thus, the ion current detecting means 120 generates an ion current signal E in the form of a voltage corresponding to the ion current I at the opposite ends of the resistor 122.

Figure 2:
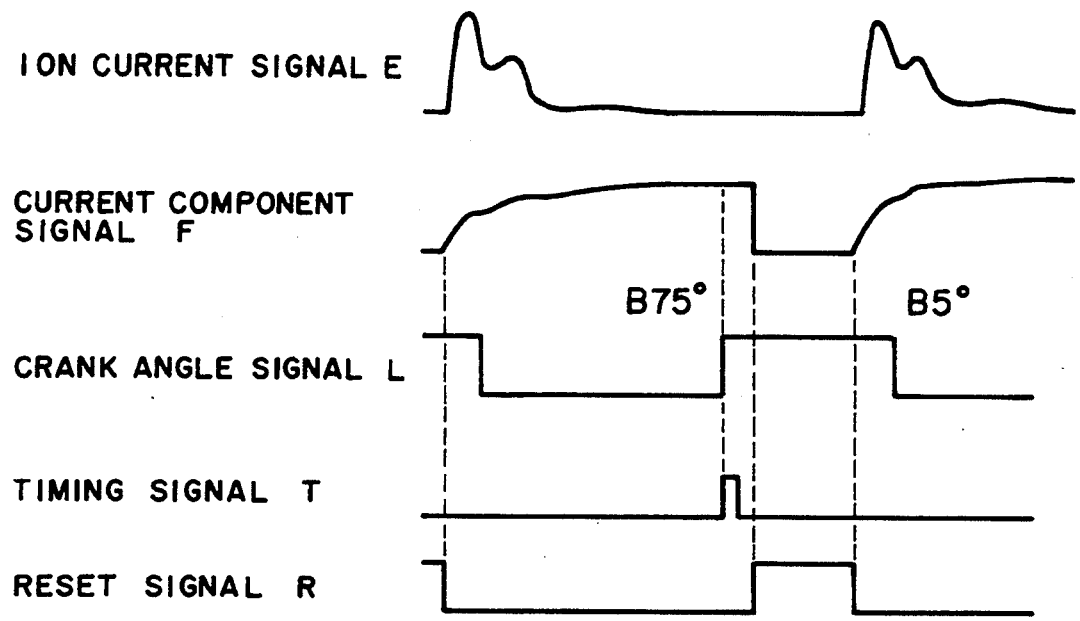
FIG. 2 is a view showing the waveforms of signals at various parts of the misfiring detecting apparatus of FIG. 1.

A current component detecting means 130 in the form of an integrator receives the ion current signal E from the ion current detecting means 120 to integrate it until it receives a reset signal R from an electronic control unit (ECU) 140 which will be described in detail later. The integrator 130 is reset by a reset signal R from the ECU 140 so that the analog output F of the integrator 130 in the form of a current component signal becomes low as long as the reset signal R is high, as shown in FIG. 2.

The ECU 140 comprises an A/D converter 141 connected to the output of the current component detecting means 130 for converting the output signal F thereof corresponding to the level of the ion current signal E from analog into digital form, an engine operating condition determiner 142 which is connected to receive an output signal L of the signal generator S representative of prescribed crank positions of cylinders of the engine and an output signal D of an engine condition sensing means (not shown) representative of the engine operating condition, and generates an output signal G representative of the detected engine operating condition, a threshold calculator 143 for calculating a threshold TH based on the engine operating condition determining signal G from the engine operating condition determiner 142, a comparator 144 for making a comparison between the A/D converted current component signal F and the threshold TH to provide an output signal H if F<TH, and a misfire determiner 145 for determining, based on the output signal H from the comparator 144, whether there is misfiring in a cylinder and generating a misfiring signal M if it is determined that the cylinder is misfiring, and a controller 146 for controlling the engine operation such as ignition timing, ignition energy, fuel injection and the like based on the misfiring signal M.

The engine operating condition determiner 142 generates a timing signal T synchronously with the rising edge of a pulse of the output signal L of the signal generator S representative of a prescribed crank angle (e.g., 75 degrees before top dead center) of a corresponding cylinder, which is fed to the A/D converter 141 so that a current component signal F from the current component detecting means 130 is periodically input to the AD converter 141 at a prescribed timing, i.e., upon receipt of the timing signal T from the engine operating condition determiner 142. The engine operating condition determiner 142 also generates a reset signal R to the current component detecting means 130 so as to reset the current component signal F immediately after the signal F has been input to the A/D converter 141. As shown in FIG. 2, the reset signal R is in the form of a rectangular pulse having a pulse width corresponding to a noise range of the ion current signal E, in which noise is liable to be generated, for the purpose of removing the effects of noise for the improved reliability of the current component signal F. Furthermore, the engine operating condition determiner 142 generates an engine operating condition signal G based on an engine condition signal D from an unillustrated engine condition sensing means representative of the operating condition of the engine such as the number of revolutions per minute of the engine, the engine load, engine coolant temperature, intake air temperature, the amount of fuel to be injected into each cylinder, etc. For example, on the basis of the engine operating condition signal G which is generated by the engine operating condition determiner 142 based on the number of revolutions per minute of the engine and the engine load, the threshold calculator 143 first calculates a threshold TH while looking at a threshold map which is prepared and stored in advance in an appropriate portion such as a ROM (not shown) of the ECU 140, and then properly modifies it based on the amount of fuel injection which is also input as a signal D to the engine operating condition determiner 142. In this case, the greater the amount of fuel injection, the higher the level of the ion current I becomes, so the threshold TH is modified to increase in accordance with the increased amount of fuel injection.

In this regard, it is also possible, though not illustrated, to set a threshold TH on the basis of the engine operating condition determining signal G and the current component signal F without using such a threshold map. In this case, the threshold TH can be calculated based on the current component signal F as follows:

$$TH = F \times J$$

where J is a coefficient of modification which is determined based on the engine operating condition signal G. The threshold TH thus calculated can be averaged to provide an average threshold $TH_n$ using the following formula:

$$TH_n = k_1 \times TH_{n-1} + k_2 \times F_n + K$$

where $TH_{n-1}$ is the last or most recently averaged threshold, $F_n$ is the present current component signal, K is a modification term which is determined by the engine operating condition, and $k_1$ and $k_2$ are coefficients of averaging having the following relationship:

$$1 > k_1 > k_2 > 0$$

Figure 3:
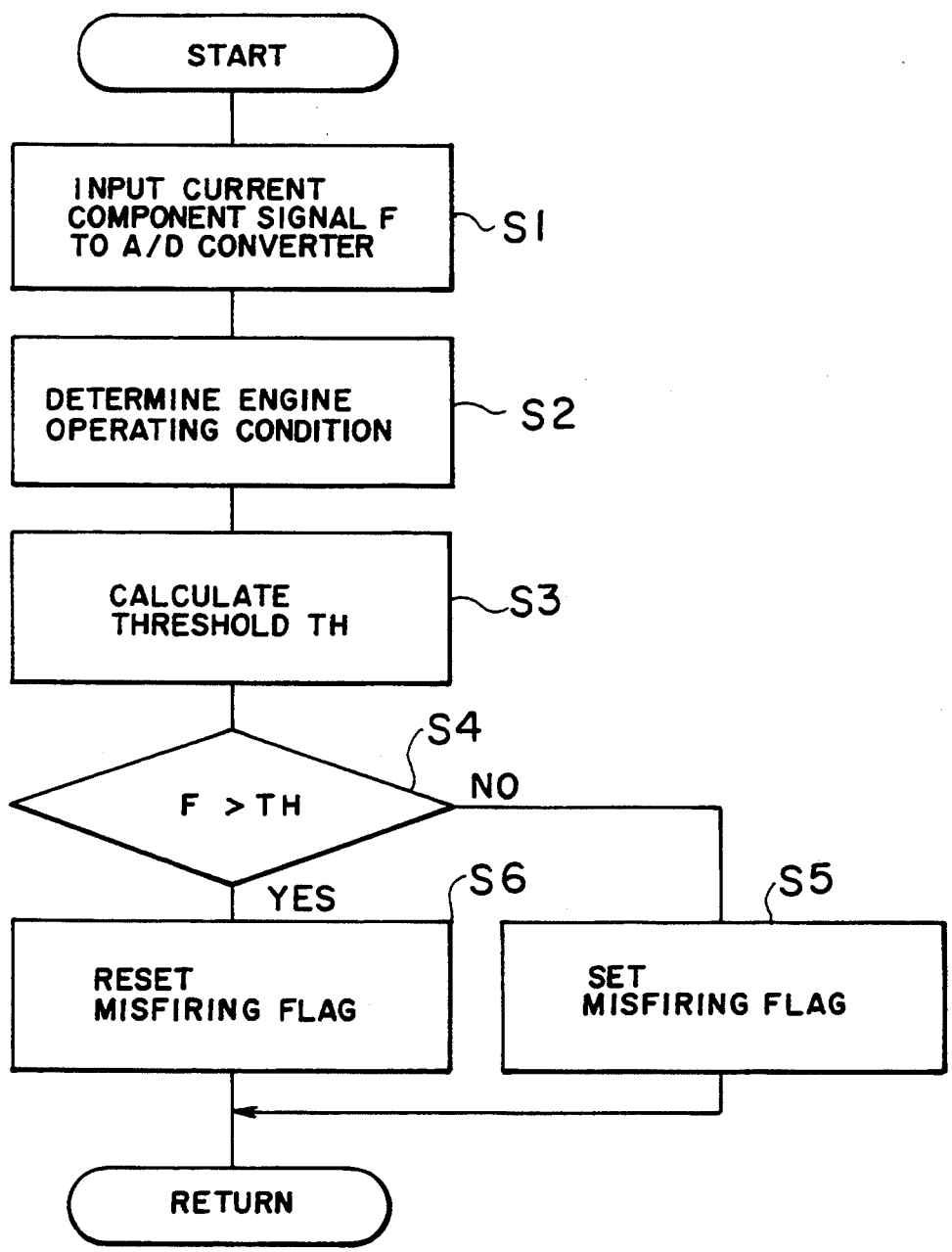
FIG. 3 is a flow chart showing the operation of the apparatus of FIG. 1.

The operation of this embodiment will now be described in detail with particular reference to the waveform diagram of FIG. 2 and the flow chart of FIG. 3.

Based on the signal L from the signal generator S, which contains a series of rectangular pulses each corresponding to prescribed crank positions of a corresponding cylinder, the controller 146 cuts off the current supply to the base of the transistor 111 to cause the spark plug 111 to discharge at prescribed timing. Immediately after the discharge, there develops an ion current I in the space between the electrodes of the spark plug 113 which flows into the ion current detecting means 120 where it is converted into a corresponding voltage E across the resistor 122. The voltage E across the resistor 122 is input to the current component detecting means 130 and integrated there to provide a current component signal F corresponding to the level or magnitude of the generated ion current I, as shown in FIG. 2.

First, in Step S1, the engine operating condition determiner 142 of the ECU 140 generates a timing signal T at the rising edge of a pulse of the signal L (e.g., at 75 degrees BTDC) which is fed to the A/D converter 141 where the current component signal F is converted from analog to digital form at prescribed timing determined by the timing signal T. Immediately after the input to the A/D converter 141 of the current component signal F (i.e., immediately after 75 degrees BTDC), the engine; operating condition determiner 142 generates a reset signal R to the current component detecting means 130 to reset the current component signal F. The reset signal R contains a rectangular pulse with a pulse width corresponding to a predetermined period of time during which the current component signal F is masked. The reset signal R terminates immediately after the following ignition has taken place so that the current component signal F again begins to rise at a time before the signal L falls, e.g., at 5 degrees BTDC. As a result, the current component signal F is effectively prevented from being superposed by noise for the predetermined time immediately before the occurrence of ignition. This ensures that an accurate ion current, signal F without inclusion of the noise is input, to the A/D converter 141.

The current component signal F thus A/D converted may be compared with a threshold TH of a predetermined constant value, but it is desirable to be compared with a variable threshold TH which varies in dependence upon the operating condition of the engine since the level of the ion current I fluctuates or changes in accordance with the engine operating condition.

To this end, in Step S2, based on the signal L and the engine operating condition signal D, the engine operating condition determiner 142 detects the operating condition of the engine and provides a corresponding output, signal G.

Subsequently in Step S3, the threshold calculating means 143 calculates a threshold TH based on the engine operating condition signal G. In this connection, if the number of revolutions per minute of the engine is high or if the engine load is high for example, the threshold TH is set to a larger value since in these cases the level of the ion current I becomes higher.

Thereafter in Step S4, the comparator 144 makes a comparison between the A/D converted current component signal F and the threshold TH. If $F \leq TH$. it outputs a misfiring detection signal H, and then in Step S5, the misfire determiner 145 determines that there is misfiring in a cylinder and thus sets tip a misfiring flag. In contrast, if $F > TH$, then in Step S6, the misfire determiner 145 determines that there is no misfiring in the cylinder and resets the misfiring flag for the cylinder. After Step S5 or S6, a return is performed. Thus, the above Steps S1 through S6 are repeated at appropriate timing for each pulse in the signal L so that if a cylinder is misfiring, the misfiring cylinder can be immediately detected.

Upon receipt of the misfiring signal H from the comparator 144, the misfire determiner 145 determines that there is misfiring in a cylinder, and generates a misfiring signal M to the controller 146 which takes appropriate action for preventing or remedying the misfiring.

In this connection, even if a noise pulse is superposed on the ion current signal E to change the peak level thereof, the current component signal F, which is an integrated form of the ion current signal E, will not be affected to any substantial extent, thus taking a stable value. This serves to prevent incorrect detection of the combustion state of each cylinder, making it possible to perform exact misfiring detection with a high degree of reliability at all times.

Figure 4:
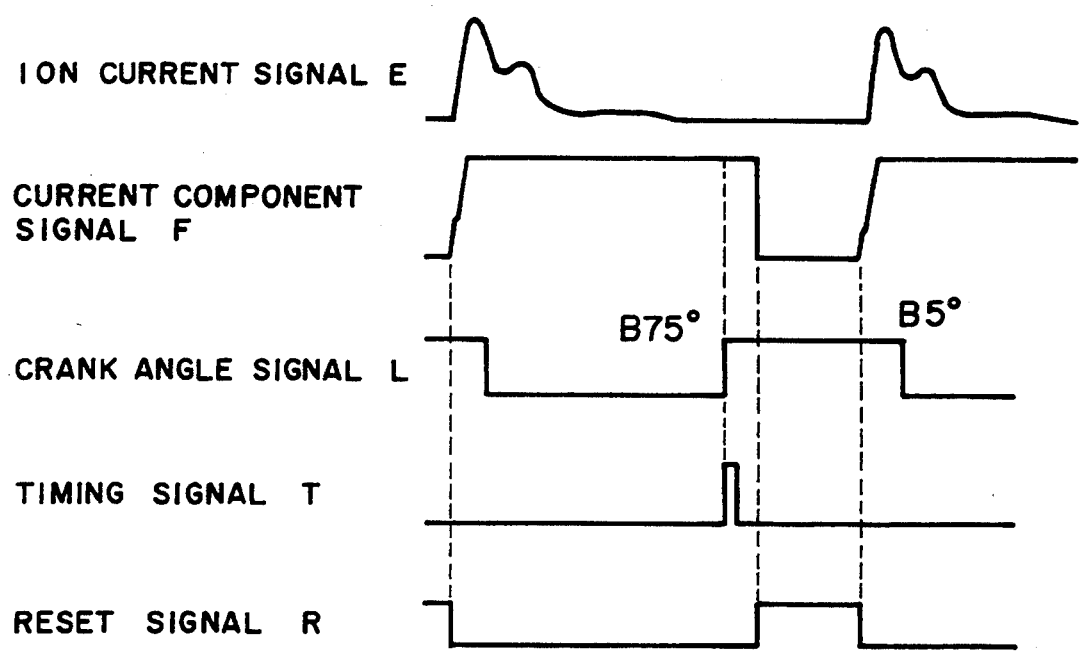
FIG. 4 is a view similar to FIG. 2, but showing the waveforms of signals in accordance with a modified form of misfiring detecting apparatus of the invention.

Although in the above embodiment, the current component detecting means 130 takes the form of an integrator, it can be a peak-hold circuit for example. In this case, the peak-hold circuit generates a current component signal F having a peak-held waveform, as shown in FIG. 4, which, similar to the integrator, is input to the A/D converter 141 at prescribed timing determined by a timing signal T from the engine operating condition determiner 142. In addition, a low-pass filter can be provided at the input side of the current component detecting means 130 for removing the influence of noise pulses of high frequencies to be superposed on the current component signal F.

Figure 5:
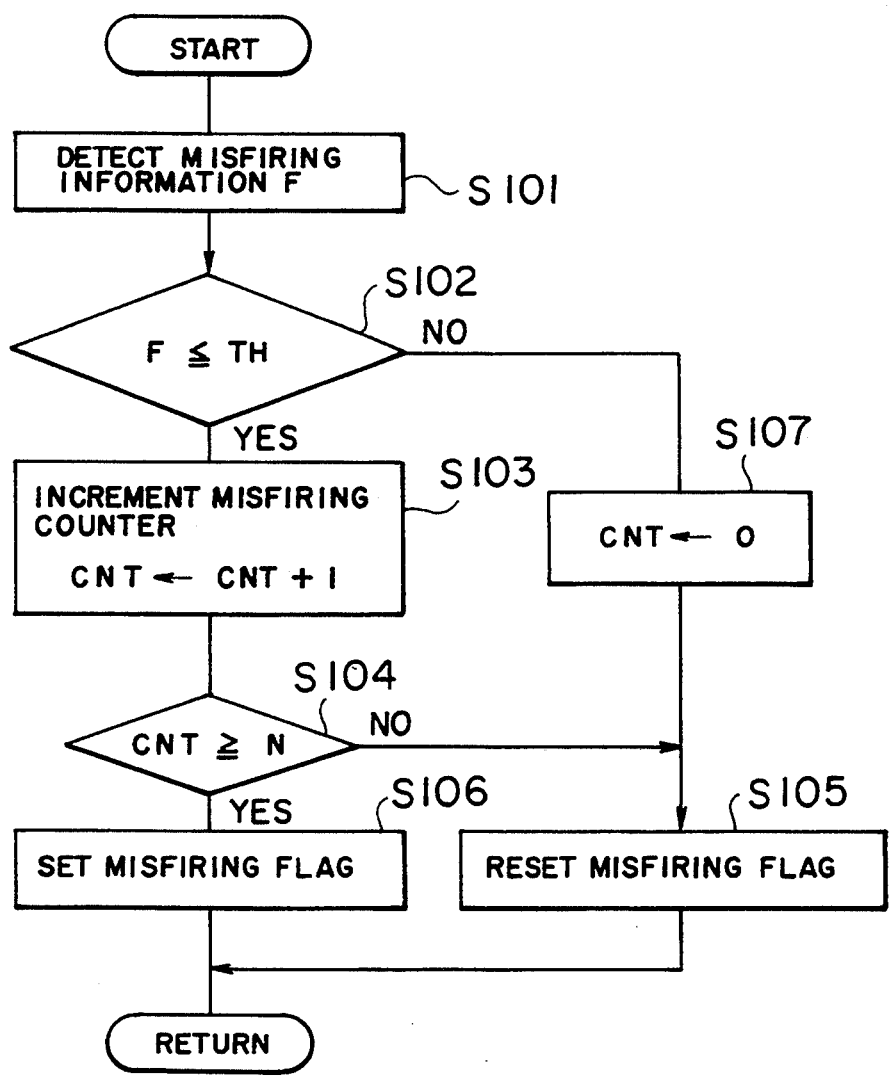
FIG. 5 is a flow chart showing a misfiring determination method in accordance with the invention.
Figure 6:
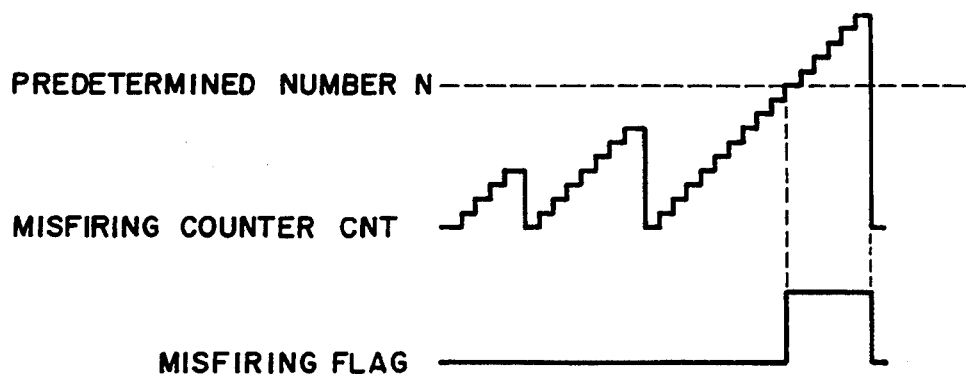
FIG. 6 is an explanatory view showing the operation of a misfiring counter as used for the misfiring determination method of FIG. 5.

FIGS. 5 and 6 show a misfiring detecting method in accordance with one preferred embodiment of the present invention. This method can be carried out by the misfiring detecting apparatus of FIG. 1 using, as misfiring information, an ion current I as developed between the electrodes of the spark plug 113 upon discharge thereof, but it can likewise be performed using other kinds of misfiring information such as a cylinder internal pressure by means of an ECU which is substantially similar to the ECU 140 of FIG. 140 except for the fact that a cylinder pressure signal in analog form representative of the internal pressure in a cylinder is input to the A/D converter 141 where it is converted into digital form.

To this end, the misfire determiner 145 includes a misfiring counter for counting the misfiring detection output H from the comparator 144. At first, the misfiring counter is reset or cleared to zero, and a misfiring flag is also reset. A predetermined reference number N used for misfiring determination is preset and stored in the misfire determiner 145 in advance.

Referring first to FIG. 5, in Step S101, a piece of misfiring information such as an ion current I, which is converted into a corresponding voltage E by the ion current detecting means 120 and then integrated or peak held by the current component detecting means 130 as referred to above with reference to the misfiring detecting apparatus of FIG. 1, is input, as misfiring information in the form of a current component signal F, to the A/D converter 141 of the ECU 140 at prescribed timing determined by the signal L from the signal generator S.

In Step S102, the misfiring information F thus A/D converted is input to the comparator 144 where it is compared with a threshold TH which is determined in the same manner as previously described with reference to FIG. 1. If $F \leq TH$, in Step S103, the misfire determiner 145 increments the unillustrated misfiring counter by 1, and then in Step S104, it is determined whether the number CNT counted by the misfiring counter is equal to or greater than the predetermined number N.

If $CNT < N$, then in Step S105, the misfire determiner 145 resets the misfiring flag, whereas if $CNT \geq N$, in Step S106, the misfiring flag is set up, and the misfire determiner 145 determines that there is misfiring in a cylinder. Thereafter, a return is performed so that Steps S101 through S105 are repeated upon every ignition at appropriate timing determined by the signal L.

In this manner, the misfiring counter provides an indication of the number of successive misfirings detected, as shown in FIG. 6. As apparent from this figure, when the number of successive misfiring reaches the predetermined number N, the misfiring flag is set to alert of abnormal misfiring situation.

It is desirable that the threshold TH as used in the misfiring detection Step S102 be modified in accordance with misfiring information or the operating condition of the engine. This is because in the event that the number of revolutions per minute of the engine or the engine load is high for example, the level of misfiring information will become higher, so a higher threshold TH is required for reliable misfiring determination.

Although in this embodiment, the result of misfiring detections is statistically processed in such a manner that the determination of misfiring is made when the number of successive misfirings reaches the predetermined value N, misfiring determination can also be made when the rate of misfiring within a predetermined number of ignitions becomes equal to or greater than a prescribed reference value.

Figure 7:
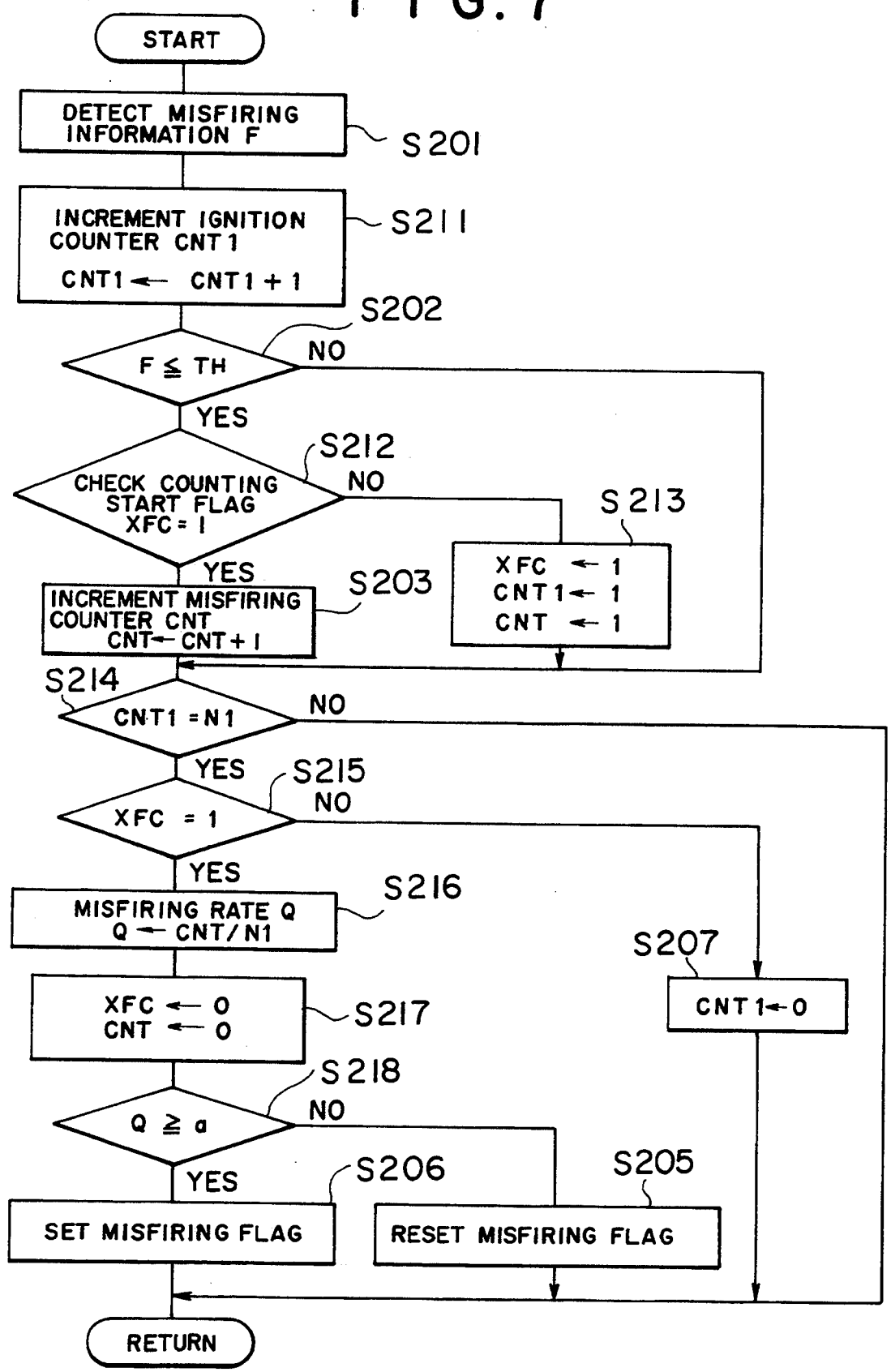
FIG. 7 is a flow chart showing a misfiring determination method in accordance with another embodiment of the invention.

FIG. 7 shows another misfiring detecting method of the invention utilizing such a misfiring rate. In this figure, Steps 201 through S203 and Steps S208 through S207 are the same as Steps 101 through 103 and Steps 105 through S107, respectively, of FIG. 5.

To this end, the ECU 140 includes a first counter in the form of an ignition counter CNT1 for counting the number of ignitions and a second counter in the form of a misfiring counter CNT for counting the number of misfirings, First, the ignition counter CNT1 and the misfiring counter CNT are cleared, and a misfiring flag as well as a counting start flag XFC are reset. A predetermined number N1 used for determining the time when the rate of misfiring is calculated is preset and stored in the ECU 140 in advance.

First, in Step S201, misfiring information F is detected and input to the A/D converter 141 similar to Step S101 of FIG. 5, and then in Step S211, the ignition counter CNT1 is incremented by 1. Thereafter, in Step S202, the A/D converted misfiring information F is input to the comparator 144 for comparison with a threshold TH. If V≦TH, then in Step S212, it is determined, based on the counting start flag XFC, whether the misfiring counter CNT has started counting, i.e., XFC=1.

If the misfiring counter CNT has already started counting (i.e., XFC is not equal to 1), then in Step S203, the misfiring counter CNT is incremented by 1. If, however, the misfiring counter CNT has not yet started counting (i.e., XFC=1), then in Step S213, the counting start flag XFC is set to "1", and the ignition counter CNT1 and the misfiring counter CNT are both set to "1" and started to increment or count.

Subsequently in Step S214, it is determined whether the ignition counter CNT1 has reached the predetermined value N1. On the other hand, if in Step S202 it is determined F>TH, the process directly jumps into Steps S214. If in Step S211 it is determined that the ignition counter CNT1 has not yet reached the predetermined value N1 (i.e., CNT1<N1), the process immediately returns to Step S201. If CNT1≧N1 in Step S214, however, the process goes to Step S215 where it is determined whether the counting start flag XFC is set up. If the answer is "YES", then in Step S216, the rate of misfiring Q (i.e., the ratio of the number of misfirings CNT as counted by the misfiring counter to the predetermined number of ignitions N1) is calculated using the following formula:

$$Q = CNT/N1$$

Thereafter in Step S217, the counting start flag XFC and the misfiring counter CNT are both reset.

Subsequently in Step S218, the rate of misfiring Q thus calculated is compared with a reference value α. If Q<α, then in Step S205, the misfiring flag is reset, whereas if Q≧α, the process goes to Step S206 where the misfiring flag is set up and then a return is performed.

On the other hand, if it is determined in Step S215 that the counting start flag XFC has not yet been set up, in Step S207, the ignition counter CNT1 is reset and then a return is performed.

In this manner, it is determined that there is misfiring if the number of misfiring detections CNT within the predetermined number of ignitions N1 or the rate of misfiring Q is greater than the reference value α.

Since when misfiring is first detected, the counting start flag XFC is set up and the counters CNT1 and CNT are started to count in Step S213, there is no possibility of the rate of misfiring Q being needlessly calculated at the time when there is no misfiring. Starting to increment the counters CNT1 and CNT upon a first detection of misfiring serves to make the rate of misfiring Q greater, which is on the safer side for misfiring determination.

Although in the above-described misfiring determining methods as illustrated in FIGS. 5 and 7, the prescribed numbers N, N1 and the reference value α used for misfiring determination are constant, they may be varied or modified in dependence upon the operating condition of the engine.

Figure 8:
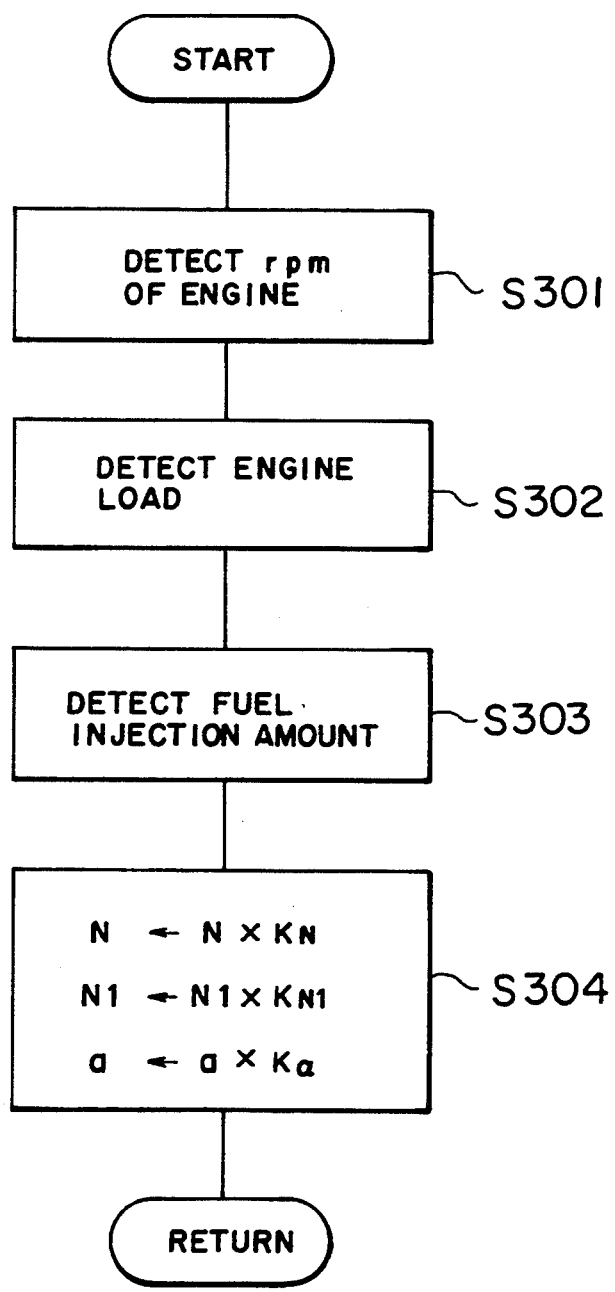
FIG. 8 is a flow chart showing a calculation routine for calculating a misfiring determination reference value as used in the misfiring determination methods of FIGS. 5 and 7.

FIG. 8 shows a routine for calculating the above reference values N, N1 and α as used for misfiring determination, which is preferably to be executed before the misfiring detecting method of FIG. 5 or FIG. 7 is performed.

First, in Steps S301 through S303, the number of revolutions per minute of the engine, the engine load and the amount of fuel to be injected into each cylinder are calculated, respectively. Then in Step S304, the predetermined numbers N, N1 and the reference value α are calculated as follows:

$$N \leftarrow N \times K_N$$

$$N1 \leftarrow N1 \times K_{N1}$$

$$\alpha \leftarrow \alpha \times K_\alpha$$

where $K_N$, $K_{N1}$ and $K_\alpha$ are modification coefficients determined in accordance with the engine operating condition. In this regard, for the purpose of determining the engine operating condition, the temperature of an engine coolant, the temperature of intake air and the like can be detected in addition to or instead of the above factors.

Modifying the misfiring determining reference values N, N1 and α in the above manner can further improve the accuracy in misfiring determination. For example, when a driver releases the accelerator pedal of a vehicle while traveling at high speeds, the amount of fuel supply to each cylinder is reduced or suppressed, resulting in a continuous misfiring situation. In this case, however, based on signals from various sensors representative of the engine operating condition, the misfiring determining reference numbers N, N1 and the reference value α are set to greater values, so the possibility of incorrectly determining an abnormal misfiring situation can be reduced to a substantial extent.

Although in the above embodiments, the ion current is employed as misfiring information, other kinds of misfiring information such as the internal pressure in each cylinder can instead be used with substantially the same results.

Figure 9:
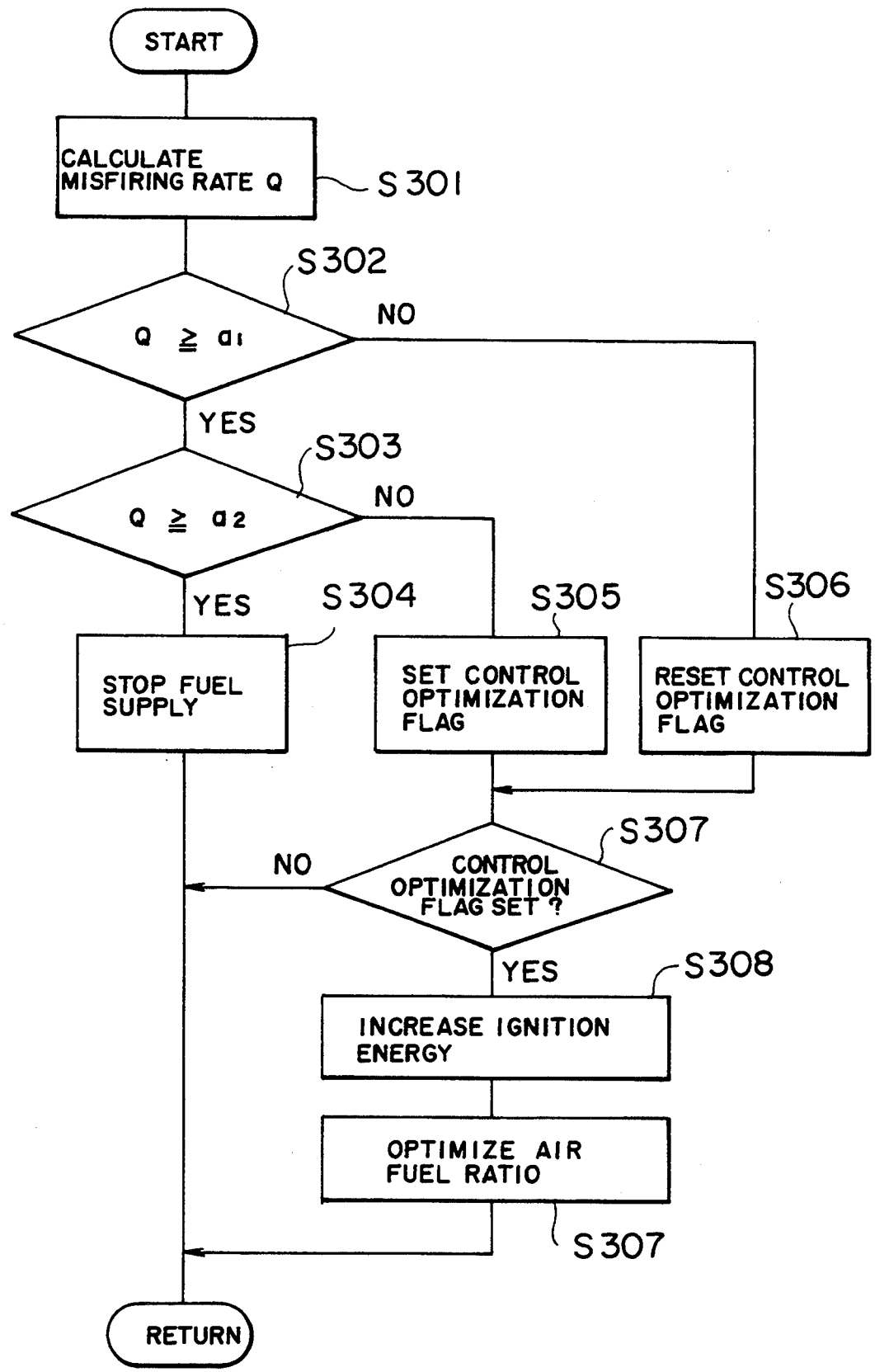
FIG. 9 is a flow chart showing a misfiring determination method in accordance with a further embodiment of the invention.

FIG. 9 shows a control optimization method for avoiding or remedying a misfiring situation by use of the rate of misfiring as calculated in the misfiring detecting method of FIG. 7 in accordance with the present invention. This method can be carried out by the misfiring detecting apparatus off FIG. 1.

In this method, misfiring information takes the form of an ion current I, which is converted into a voltage E by the ion current detecting means 120 and integrated or peak held by the current component detecting means 130 to provide a current component signal F as shown in FIG. 1. The misfiring information F is processed substantially in the same manner as in the misfiring detecting method of FIG. 7 to provide the rate of misfiring Q as in Step S216. According to the control optimization method of the invention, the rate of misfiring Q thus obtained is further processed in the manner as shown in FIG. 9.

Specifically, first in Step S301, the rate of misfiring Q is calculated as in the misfiring detecting method of FIG. 7. Then in Step S302, the rate of misfiring Q is compared with a first reference value $\alpha_1 u$. If $Q > \alpha_1$, in Step S303, the rate of misfiring Q is further compared with a second reference value $\alpha_2$ which is greater than the first reference value $\alpha_1$. IF $Q \geq \alpha_2$, it is determined that there is an abnormal or serious misfiring situation in a cylinder, and in Step S304, the fuel supply to the misfiring cylinder is stopped. Thereafter, a return is performed.

On the other hand, if $\alpha_2 > Q \geq \alpha_1$, then in Step S305, a control optimization flag for the misfiring cylinder is set up. Subsequently in Step S307, it is determined whether the control optimization flag is set. If the answer is "YES", a control optimization method is carried out for the purpose of avoiding or remedying the misfiring situation. That is, in Step S308, the ignition energy of the spark plug 113 of FIG. 1 is properly increased, for example, by increasing the power supply to the ignition coil 112 or by performing continuous firing. Then in Step S309, the air/fuel ratio of a mixture to be supplied to the misfiring cylinder is optimized so as to be about 14.7 in weight percentage. In this connection, for the purpose of control optimization, one of Steps S308 and S309 may be omitted. With at least one of these measures, light or not so serious misfiring can be remedied, recovering normal combustion in the cylinder.

Further, if the rate of misfiring Q is less than the first reference value $\alpha_1$ ($Q < \alpha_1$) in Step S302, the detected misfiring is determined to be in an allowable range (i.e., light or normal misfiring). Thus, in this case, it is considered that normal combustion takes place in the misfiring cylinder. Therefore, in Step S306, the control optimization flag is reset, and then the process goes to Step S307. If it is determined in Step S307 that there is no control optimization flag set, a return is performed.

In addition, if $Q < \alpha_1$ in Step S302, a misfiring flag for the misfiring cylinder may be reset, and if $Q > \alpha_2$, the misfiring flag may be set up. Thus, if the misfiring flag is set up, the system can be alerted to an abnormal or serious misfiring situation.

Although in the above description, the first and second references $\alpha_1$, $\alpha_2$ are of the predetermined constant values, they can be modified in accordance with the engine operating condition.

Moreover, in the above-described control optimization method of FIG. 9, the rate of misfiring Q is compared with the first and second references $\alpha_1$, $\alpha_2$ for determining the extent or level of misfiring, but the number of successive misfirings can be used for the same purpose. In this case, the misfiring counter as used in the FIG. 7 method counts successive misfirings, and when the number of successive misfirings reaches a reference value, it is determined that there is an abnormal misfiring situation, as in the method of FIG. 5. More specifically, a first reference number N2 and a second reference number N3, which is larger than the former, are preset, and when the number of successive misfirings reaches the second reference value N3, the fuel supply t-o the misfiring cylinder is stopped, whereas if the number of successive misfirings is less than N3 but equal to or greater than N2, the control optimization process of FIG. 9 is performed.

What is claimed is:

1. A method for detecting misfiring in an internal combustion engine comprising the steps of:
   generating a misfiring signal representative of misfiring in a cylinder;
   comparing the misfiring signal with a threshold so as to determine whether the misfiring signal is equal to or less than the threshold;
   incrementing a misfiring counter if the misfiring signal is equal to or less than the threshold;
   resetting the misfiring counter if the misfiring signal is greater than the threshold; and
   determining that there is misfiring in the cylinder when the misfiring counter reaches a prescribed number,
   further comprising the steps of:
   detecting an engine operating condition; and
   modifying the prescribed number based on the detected engine operating condition.

2. A method for detecting misfiring in an internal combustion engine comprising the steps of:
   generating a misfiring signal representative of misfiring of a cylinder;
   comparing the misfiring signal with a threshold so as to determine whether the misfiring signal is equal to or less than the threshold;
   incrementing a misfiring counter if the misfiring signal is equal to or less than the threshold;
   resetting the misfiring counter if the misfiring signal is greater than the threshold; and
   comparing the counted number of the misfiring counter with a first reference number and a second reference number which is greater than the first reference number;
   determining that there is no misfiring in the cylinder if the misfiring counter is greater than the second reference number;
   determining that, there is normal misfiring in the cylinder if the misfiring counter is equal to or less than the second reference number but greater than the first reference number; and
   determining that there is abnormal misfiring in the cylinder if the misfiring counter is equal to or less than the first reference number.

3. A method according to claim 2, further comprising the steps of:
   stopping the fuel supply to the misfiring cylinder if it is determined that there is abnormal misfiring in the cylinder; and
   optimizing the operation of the misfiring cylinder if it is determined that there is normal misfiring in the cylinder.

4. A method according to claim 3, wherein said step optimizing the operation of the misfiring cylinder comprises taking at least one of the following steps of:
   increasing the ignition energy for the misfiring cylinder; and
   optimizing the fuel supply to the misfiring cylinder.

5. A method according to claim 2, further comprising the steps of:
   detecting an engine operating condition; and
   modifying the first and second reference numbers based on the detected engine operating condition.

6. A method for detecting misfiring in an internal combustion engine comprising the steps of:
   generating a misfiring signal representative of misfiring of a cylinder;

incrementing an ignition counter for counting the number of ignitions for the cylinder upon generation of the misfiring signal;

comparing the misfiring signal with a threshold so as to determine whether the misfiring signal is equal to or less than the threshold;

incrementing a misfiring counter for counting the number of misfiring of the cylinder if the misfiring signal is equal to or less than the threshold;

calculating the rate of misfiring for the cylinder based on the counted number of the misfiring counter when the ignition counter reaches a prescribed number; and determining that there is misfiring in the cylinder if the rate of misfiring is greater than a prescribed reference.

7. A method according to claim 6, wherein said steps of incrementing the ignition counter and the misfiring counter are started at the time when it is first determined that the misfiring signal is equal to or less than the threshold.

8. A method according to claim 6, further comprising the steps of:

detecting an engine operating condition; and modifying the prescribed number and the prescribed reference based on the detected engine operating condition.

9. A method for detecting misfiring in an internal combustion engine comprising the steps of:

generating a misfiring signal representative of misfiring of a cylinder;

incrementing an ignition counter for counting-the number of ignitions for the cylinder upon generation of the misfiring signal;

comparing the misfiring signal with a threshold so as to determine whether the misfiring signal is equal to or less than the threshold;

incrementing a misfiring counter for counting the number of misfiring of the cylinder if the misfiring signal is equal to or less than the-threshold;

calculating the rate of misfiring for the cylinder based on the counted number of the misfiring counter when the ignition counter reaches a prescribed number;

comparing the rate of misfiring with a first reference and a second reference which is greater than the first reference;

determining that there is no misfiring in the cylinder if the rate of misfiring is less than the first reference;

determining that there is normal misfiring in the cylinder if the rate of misfiring is equal to or greater than the first reference but less than the second reference; and determining that there is abnormal misfiring in the cylinder if the rate of misfiring is equal to or greater than the second reference.

10. A method according to claim 9, wherein said steps of incrementing the ignition counter and the misfiring counter are started at the time when it is first determined that the misfiring signal is equal to or less than the threshold.

11. A method according to claim 9, further comprising the steps of:

detecting an engine operating condition; and modifying the prescribed number and the first and second references based on the detected engine operating condition.

12. A method according to claim 9, further comprising the steps of:

stopping the fuel supply to the misfiring cylinder if it is determined that there is abnormal misfiring in the cylinder; and optimizing the operation of the misfiring cylinder if it is determined that there is normal misfiring in the cylinder.

13. A method according to claim 12, wherein said step of optimizing the operation of the misfiring cylinder comprises taking at least one of the following steps of:

increasing the ignition energy for the misfiring cylinder; and optimizing the fuel supply to the misfiring cylinder.

* * * * *